Oct. 27, 1953 LE ROY V. JACOBSEN Re. 23,730

CAMBER AND CASTER GAUGE

Original Filed Nov. 29, 1948 2 Sheets-Sheet 1

INVENTOR.
L. V. JACOBSEN

BY
Merrill M. Blackburn

ATTORNEY

CAMBER AND CASTER GAUGE

Original Filed Nov. 29, 1948 2 Sheets-Sheet 2

INVENTOR.
L. V. JACOBSEN
BY
Merrill M. Blackburn
ATTORNEY

Reissued Oct. 27, 1953 Re. 23,730

UNITED STATES PATENT OFFICE 23,730

CAMBER AND CASTER GAUGE

Le Roy V. Jacobsen, Durant, Iowa, assignor to Bee-Line Company, Davenport, Iowa, a copartnership Original No. 2,569,416, dated September 25, 1951, Serial No. 62,436, November 29, 1948. Application for reissue January 14, 1952, Serial No. 266,400

9 Claims. (Cl. 33—203.18)

Matter enclosed in heavy brackets [ ] appears in the original patent but forms no part of this reissue specification; matter printed in italics indicates the additions made by reissue.

My present invention relates to a gauge particularly adapted to the determination of camber and caster of the dirigible wheels of a motor vehicle, and it is especially useful in connection with vehicles in which the upper half of the wheel is covered by the vehicle fender so that it is impractical to get at the wheel for the checking thereof with the checking devices heretofore used for this purpose. It will therefore be understood that the primary purposes of my invention are to provide a wheel-checking gauge which is usable in a practical manner with the most up-to-date construction of cars; to provide an apparatus which can be used on the lower half of a wheel for the checking of camber and caster, whether the upper half of the wheel be exposed or covered by the fender of the vehicle; and such further objects, advantages, and capabilities as will hereafter appear and as are inherent in the construction disclosed herein. My invention further resides in the combination, construction, and arrangement of parts illustrated in the accompanying drawings and, while I have shown therein the preferred embodiment of this invention, and certain modifications thereof, I desire the same to be understood as illustrative only and not to be interpreted in a limiting sense.

In the drawings annexed hereto and forming a part hereof,

Figure 1:
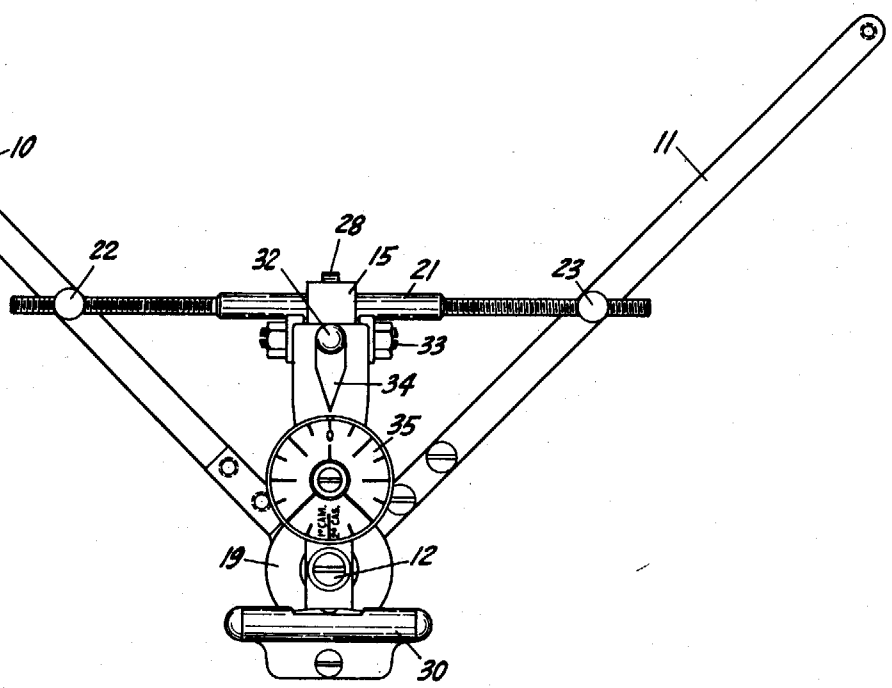
Fig. 1 is an elevation of the structure which is now regarded as the preferred embodiment of this invention.

Reference will now be made in greater detail to the annexed drawings for a more complete description of this invention. The structure of Figs. 1 and 2 comprises a pair of arms 10 and 11 which are pivotally connected by the pivot 12 provided with a reduced stem 13 having a shoulder 14 which fits against one face of body member 15 of the gauge. The pivot 12 is secured to the body member 15 by a screw 16 surrounded by a washer 17, between the body member 15 and the head of the screw 16. When the screw is tightened up, the shoulder 14 is drawn tightly against the face of the body member 15, and these parts are held against turning. The outer half of the pivot member 12 is somewhat smaller than the extreme diameter thereof to furnish a shoulder against which one face of the base of one of the pivoted arms may be held, as shown in Fig. 2. Each of these bases 18 and 19 is provided with a socket, in one of which is a spring 20 which holds the arms under tension and assists in holding them in place.

An adjusting member 21 is oppositely threaded at its two ends and cooperates with oppositely threaded nuts 22 and 23 pivotally mounted in arms 10 and 11. When the screw-threaded member 21 is turned, the arms 10 and 11 are drawn toward each other or forced apart so that the bearing surfaces 24 are adjusted to fit against the outer face of the wheel rim at opposite sides of the axle of the wheel. Another point 25 furnishes a bearing surface for the pivot 12 on the wheel rim at a point remote from the bearing surfaces 24.

A supporting member 26 carries the nut 22, rigidly but adjustably held therein, in which is rotatably carried the double ended screw 21, on which is rigidly mounted a guide member or roller 28. This roller 28 is designed to ride in a channel 29 in the back of the body member 15. The guide member or wheel 28, riding in the groove or channel 29, prevents the screw-threaded member 21 from moving laterally with relation to the body member 15. A channel 29 is cut in the back of upright 15 and cooperates with roller 28 to keep the parts 21, 10, and 11 from moving sideways. As a consenquence of this arrangement, the arms 10 and 11 may be spread outwardly or drawn toward each other by turning the screw. Therefore, the bearing members 24 and 25 may be made to fit against a shoulder of the wheel rim of different sized wheels. With the bearing member 25 fitting against the shoulder of the rim, at the bottom of the wheel, the bearing members 24 will bear against the shoulder on opposite sides of the axis of the wheel, or a little above or below the same. Therefore, since the fender covers only the upper half of the wheel, it is possible to have in sight at all times that part of the wheel on which checking work is to be done.

For the purpose of plumbing the gauge, a pair of levels 30 and 31 are provided, the length of which extend in directions at right angles to each other. The level 31 is carried by a body member 32, pivoted at 33 on the body member 15. A pointer member 34 cooperates with a graduated dial 35 in reading camber and caster inclinations. The construction and operation of the graduated dial is explained more fully in application, Serial No. 57,152, filed October 29, 1948, now Patent No. 2,554,621, issued May 29, 1951.

Figure 2:
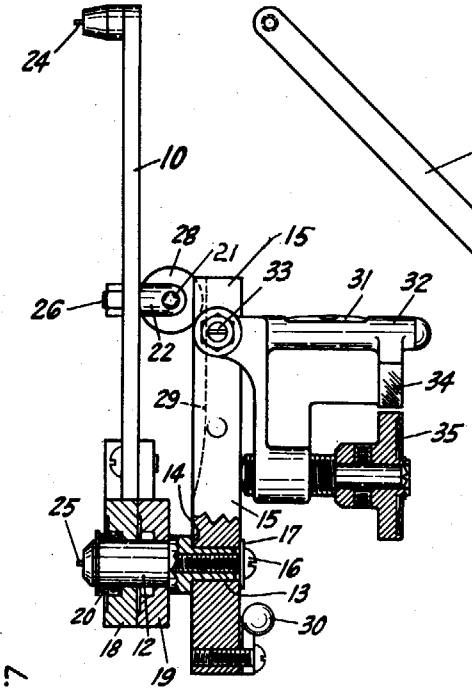
Fig. 2 is a side elevation of the structure with certain parts in section.

The primary difference between the structure of Fig. 3 and that of Fig. 1 is that in Fig. 3 the arms 10a and 11a extend beyond the pivot member 12 and, instead of the nuts 22 and 23 being used in connecting the long ends above the pivot 12, they are used in connecting the short ends below the pivot. As a result of turning the screw 21, the relative positions of the body member 15b and the arms 10a and 11a are changed, but the change is substantially the same as what takes place with the previously described construction.

The structure of Fig. 4 works in a manner similar to that explained in connection with Figs. 1 and 3, but the difference is that the posts 36 and 37 are arranged to slide longitudinally of the graduated bar 38, instead of being connected pivotally, as in the case of Figs. 1 and 3. A body member 15c is secured to the bar 38 and serves substantially the same purpose as the body member 15 in the previously described construction. The screw 16 of Figs. 1 and 2 is replaced by a screw 16a which cooperates in holding a bearing point 25, as in the case of the previously described construction. The sleeves 39, by which the posts 36 and 37 are carried, are held in adjusted position on the bar 38 by set screws 40, as is clear from Fig. 4.

Figures 3, 4, 5:
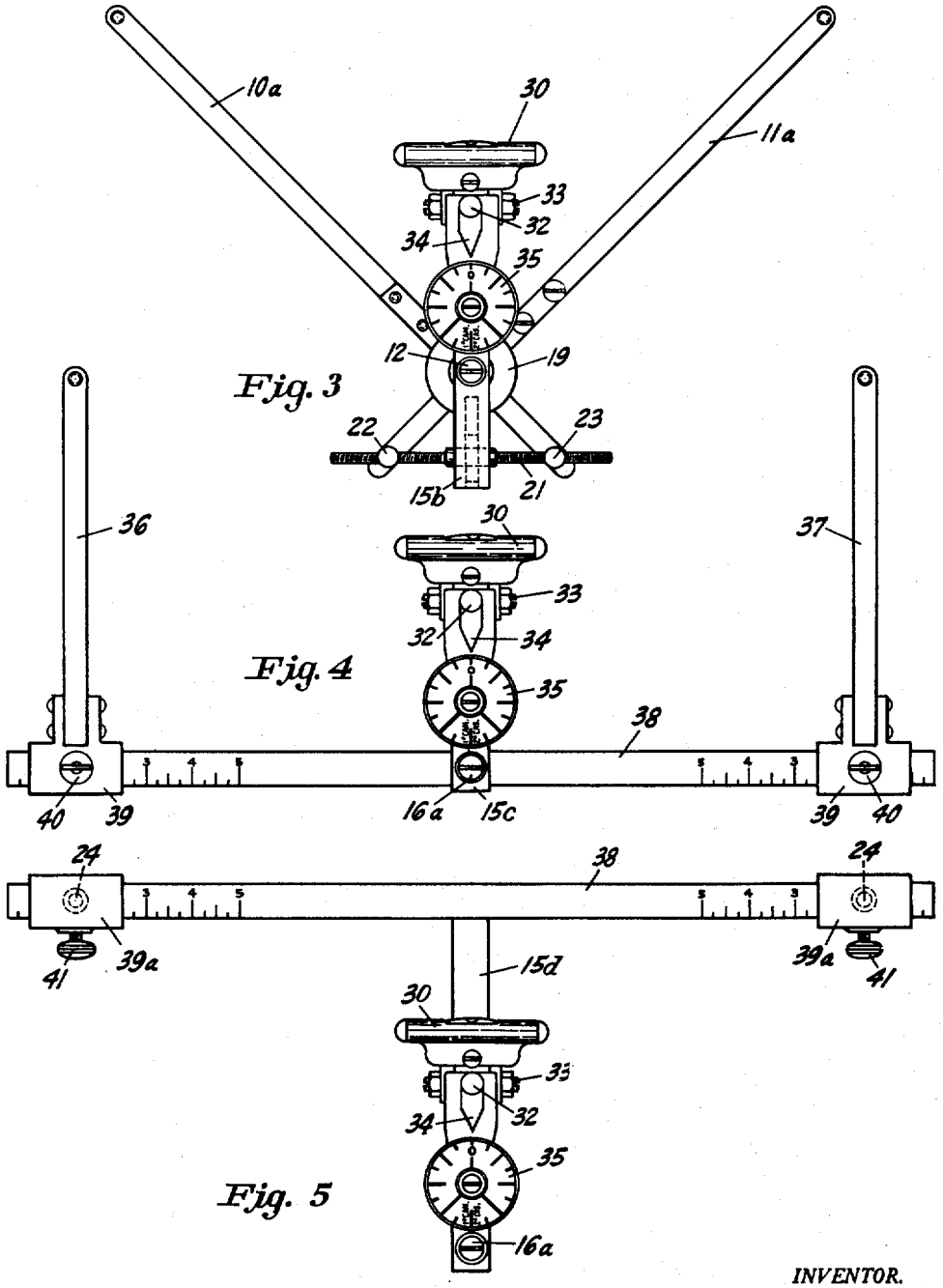
Fig. 3 is an elevational view of a modification of the apparatus shown in Fig. 1.
Fig. 4 illustrates another modification of this apparatus.
Fig. 5 represents an elevation of a still further modification of the preferred construction.

In the structure of Fig. 5, the sleeves 39a carry the bearing members 24, and these sleeves are held in adjusted position by the set screws 41. A body member 15d depends from the bar 38 and carries the level 31, the *pointed member or* indicator 34, pivot member 33, gauge dial 35, and associated parts, in part, as shown in Fig. 2.

It is of course understood that the specific description of structure set forth above may be departed from without departing from the spirit of this invention as disclosed herein and as defined by the appended claims.

Having now described my invention, I claim:

1. A camber gauge for dirigible wheels of a vehicle comprising a pair of arms and a bracket pivotally interconnected for movement about a common axis, wheel-contacting means for contacting the side of a wheel positioned at said axis and on each of said arms at a point remote from said axis, equalizing means for maintaining said bracket in a position bisecting the angle between said arms, a first level connected with said bracket for movement with respect to said bracket about a pivot perpendicular to said pivotal connection of said arms, means for indicating the angular adjustment of said level with respect to said bracket, and a second level for indicating whether said pivot of said first level is horizontal.

2. A camber gauge for dirigible wheels of a vehicle comprising a pair of arms and a bracket pivotally interconnected for movement about a common axis, wheel-contacting means for contacting the side of a wheel positioned at said axis and on each of said arms at a point remote from said axis, equalizing means for maintaining said bracket in a position bisecting the angle between said arms, an indicator pivotally connected to said bracket on a pivot perpendicular to the plane in which the indicator and the axis are located, said indicator including a level perpendicular to said pivot and a member carried by and in screw-threaded adjustment with said indicator for bearing against said bracket to indicate the angular position of said indicator about its pivot, and a second level for indicating whether said bracket is vertical.

3. A camber gauge as defined in claim 2 in which said equalizing means comprises a screw having its ends oppositely threaded and in screw-threaded engagement with said arms, and connecting means connecting a mid-portion of said screw and the bracket to maintain said bracket in a vertical plane.

4. A camber gauge comprising a bracket having a pair of pivots each perpendicular to a common line connecting the axes of said pivots, a pair of wheel-engaging arms independently pivoted upon one of said pivots, a level for indicating horizontality of the other of said pivots, a block pivoted to said other pivot, a level carried by said block, said last-named level indicating if the length of said block is horizontal, and equalizing means controlling the relative pivotal adjustment of said arms and said bracket to maintain the pivot of said block perpendicular to a plane bisecting the angle between said arms.

*5. A camber and caster gauge for the dirigible wheels of a vehicle, comprising a first body and a pair of arms, pivot means individually connecting the first body and the pair of arms about a single axis, wheel-contacting means on the side of the arms and at the axis of pivotal connection, extending the same distance from the plane of the arms for contacting the wheel so that the arms will be a fixed distance from the wheel, the contacting means being approximately at the ends of the arms, a second body carrying a first level, a pivot pivotally connecting said second body with said first body, means for indicating the angular adjustment of said first level with respect to said first body, and a second level for indicating whether said pivot of said first and second bodies is horizontal.*

*6. A camber and caster gauge comprising a vertically elongated body having a plurality of pivots, each pivot being perpendicular to the axial line of the body, a pair of wheel-engaging arms independently pivoted upon one of said pivots, a first level indicating horizontality of a second pivot, a block pivoted to said body on said second pivot, a second level carried by said block, said last named level indicating whether the length of said block is horizontal, said second level lying in a plane perpendicular to said first level for indicating changes in the relative position of said body and said block, and a graduated screw through said block and contacting said body, said screw carrying a graduated dial for indicating changes needed in the position of said body and said wheel-engaging arms to give the wheel correct camber and caster.*

*7. A camber and caster gauge for the dirigible wheels of a vehicle, comprising a body and a pair of arms pivotally interconnected to the body about a single axis, wheel-contacting means approximately at the ends of said arms for contacting the side of a wheel, the pivotal interconnection between the arms and the body constituting an axis and being remote from the axis of rotation of the wheel but parallel thereto, an indicator lying in a plane embrocing the pivotal interconnection between the arms and the body and being in the same plane with the body and the first mentioned axis, a pivot extending at a right angle to the plane in which the indicator and the first mentioned axis are located, said indicator being pivotally connected to said body on said pivot, said indicator including a level perpendicular to said pivot between the indicator and the body, a member carried by and in screw-threaded adjustment with said indicator for*

*bearing against said body to indicate the angular position of said indicator about its pivot, and a second level for indicating whether said pivot of said first level is horizontal.*

*8. A camber and caster gauge comprising a body having upper and lower pivots, the longitudinal axial line of the body and the lower one of the pivots defining a plane to which the upper pivot is perpendicular, a level block having a level, said block being pivoted on said upper pivot for rotation about said upper pivot in the first plane parallel to the axis of said lower pivot, the level of the level block being adapted to determine the deviation from vertical of the axis of the body in the first plane, arms mounted on said lower pivot for rotation in a second plane, which second plane is perpendicular to the first plane, a level on the body for determining verticality of the first-mentioned plane, and a screw in the level block, whereby the variation of the axial line of the body from the vertical in the first mentioned plane may be determined.*

*9. A camber and caster gauge comprising a body having upper and lower pivots, a level block pivoted to the upper pivot and having a level in a plane at a right angle to the upper pivot, the level block being rotatable on the upper pivot in a plane including the axis of the lower pivot, the level of the level block being adapted to determine the inclination of the body in the first plane, two arms mounted on the lower pivot for rotation in a plane perpendicular to the first mentioned plane, a level carried by the body to test verticality of the body in a plane parallel to the plane of the arms, and a graduated screw in the level block whereby the variation of the body from a vertical direction in a plane at a right angle to the plane of the arms may be determined.*

LE ROY V. JACOBSEN.

References Cited in the file of this patent or the original patent

UNITED STATES PATENTS

| Number | Name | Date |
|---|---|---|
| 1,980,487 | Klauder | Nov. 13, 1934 |
| 2,059,654 | Quigley | Nov. 3, 1936 |
| 2,137,485 | Greenleaf et al. | Nov. 22, 1938 |
| 2,402,041 | Greenleaf et al. | June 11, 1946 |
| 2,577,841 | Creagmile | Dec. 11, 1951 |

FOREIGN PATENTS

| Number | Country | Date |
|---|---|---|
| 356,387 | Great Britain | Sept. 10, 1931 |